April 4, 1967

L. J. KOVACH ETAL 3,311,952

EXTRUSION DIE FOR BLOWN FILM

Filed July 16, 1965

INVENTORS
LESLIE J. KOVACH
BRUNO V. MENEGUS
BY
William R. Lieberman
ATTORNEY

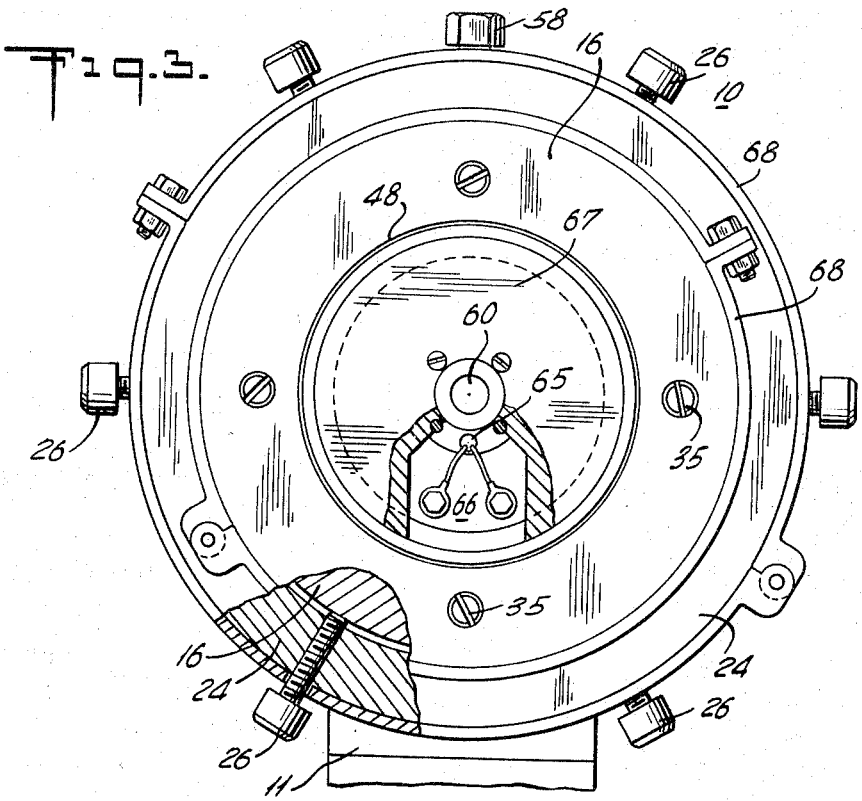
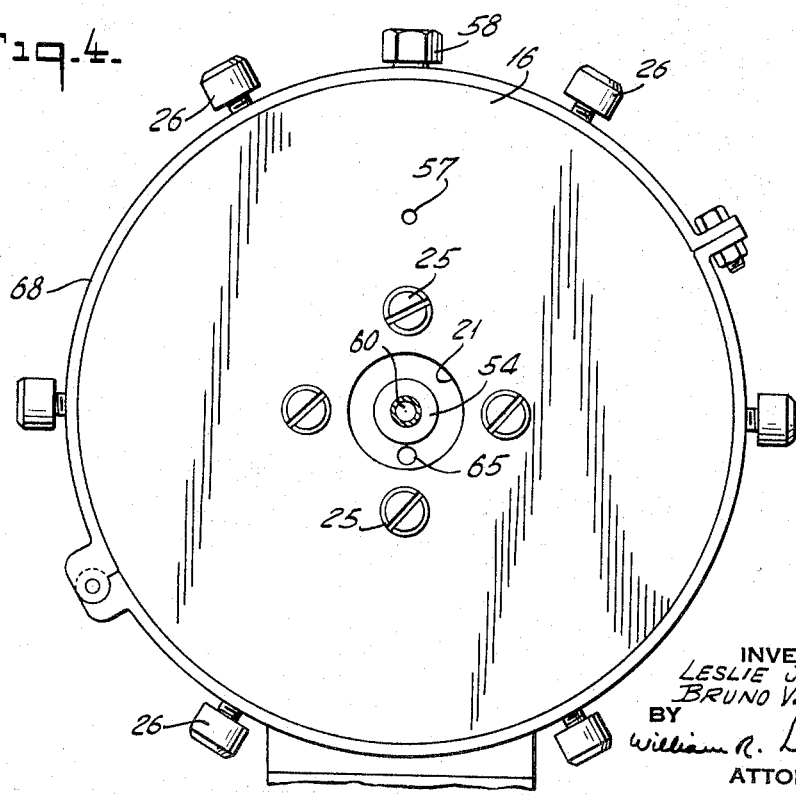

United States Patent Office 3,311,952
Patented Apr. 4, 1967

3,311,952
EXTRUSION DIE FOR BLOWN FILM
Leslie J. Kovach, Rockway, and Bruno V. Menegus, Wayne, N.J., assignors to Modern Plastic Machinery Corporation, Clifton, N.J., a corporation of Delaware
Filed July 16, 1965, Ser. No. 472,569
12 Claims. (Cl. 18—14)

The present invention relates generally to improvements in equipment for the extrusion of thermoplastic polymeric resins and it relates in particular to an improved extrusion die for the use in the production of blown film.

A method which is conventionally employed in the production of films of synthetic organic thermoplastic polymeric resins is the blown film method wherein a tube of the plastic resin in soft state is continuously extruded through an annular die opening and is withdrawn by suitable draw rolls at a predetermined rate which effects a linear extension or stretch of the extruded tube and an hermetic closing of the advancing tube is effected at a distance from the extrusion die. Compressed gas, at a predetermined temperature, is introduced through a passageway in the extrusion die into the advancing tube to blow and expand the soft tube to increase its diameter as it approaches the sealed section whereby to impart a peripheral stretch or extension to the advancing tube which is initially in a soft state and cools as it approaches the sealing area thereby to eliminate any fusion or adhesion of the abutting faces of the blown tube in the sealing area. While the blown tube method of producing thermoplastic films is employed to great advantage, it possesses many drawbacks. It is an essential requirement of this method that the initially extruded soft thermoplastic tube be of uniform thickness and have a uniform linear rate of advance. Any significant deviation from the aforesaid conditions adversely effects the process, so that the end product lacks uniformity and is frequently of no commercial value. The blown film extrusion dies heretofore available leave much to be desired. They are very expensive devices, difficult to fabricate and to adjust to the close tolerances required for satisfactory application. Their servicing, disassembly and re-assembly are highly time consuming and require a high degree of skill. They have little flexibility and adaptability.

It is, therefore, a principal object of the present invention to provide an improved extrusion device.

Another object of the present invention is to provide an improved extrusion for organic thermoplastic resins.

Still another object of the present invention is to provide an extrusion die for the production of blown film of thermoplastic organic resins.

A further object of the present invention is to provide a die for extruding thin tubes of a thermoplastic organic resin of uniform cross section and at a uniform linear rate of advance.

Still a further object of the present invention is to provide an extrusion die of the above nature characterized by its simplicity, ruggedness, reliability, low cost, and ease of assembly, servicing and adjustment.

The above and other objects of the present invention will in part be specifically pointed out hereinbelow and in part will become apparent from a reading of the following description taken in conjunction with the accompanying drawing, wherein:

FIGURE 3 is fragmented front end view of the extrusion die; and

FIGURE 4 is a rear end view thereof.

Figure 1:
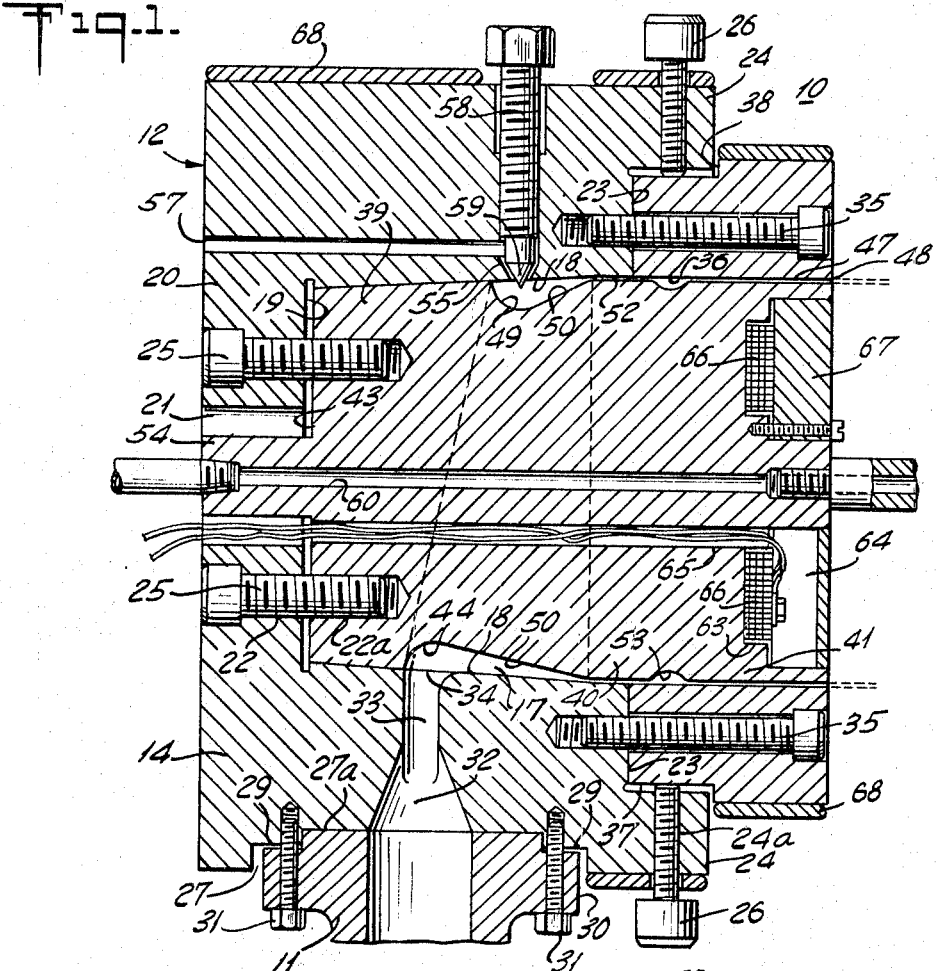
FIGURE 1 is a longitudinal sectional view of an extrusion die constructed according to and embodying the present invention.
Figure 2:
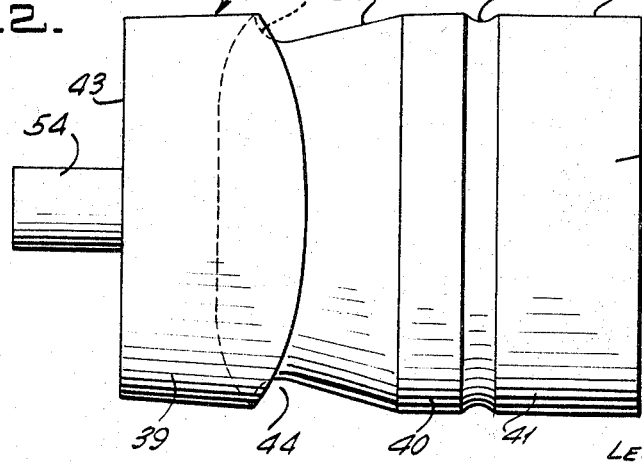
FIGURE 2 is a side elevational view of the core member thereof.

In a sense, the present invention contemplates the provision of an extrusion die comprising a body member having a well formed therein provided with a first peripheral conical surface at its inner section, and a core member nesting in said well and having a second conical peripheral surface at its inner section engaging said first surface, at least one of said members having a peripheral groove formed therein, said members having radially-spaced, confronting peripheral faces extending to the outer ends thereof to delineate an extrusion opening having a feed passage formed therein communicating with said peripheral groove to permit the feed of a plastic fluid material thereto.

According to a preferred form of the present die the body member includes a rear section having an axial well formed therein provided with a first conical surface tapering rearwardly to a base having a central aperture and a front section defined by a coaxial collar mounted on the front of the rear section and transversely adjustable and having an inner first cylindrical surface having a diameter equal to the inside diameter of the front end of the well. The core member includes a rear peripheral second conical face which engages the body member first conical surface and an end face spaced forwardly of the base of the well and a front peripheral second, cylindrical surface of less diameter than and registering with the first cylindrical surface to define an annular passageway. A first peripheral groove inclined to the longitudinal axis is formed in the core member conical surface and the rear part thereof registers with a plastic feed passage formed in the body member wall. A second peripheral groove is formed in the core member cylindrical surface and communicates with the front of the die and with the second groove by way of the annular passageway, the front of the annular passageway defining the extrusion orifice or opening. An electrical heating element is housed in the front of the core member, and longitudinal bores are formed in the core member to permit the introduction of compressed air and additives, if desired, and to provide a passageway for the electrical leads.

Referring now to the drawings which illustrate a preferred embodiment of the present invention, reference numeral 10 generally designates the improved extrusion die which is employed to advantage in the production of blown film and which is connected to the output of any conventional screw extruded by means of a coupling section 11. Extrusion die 10 comprises a main body member 12 and a core member 13, the body 12 including a rear section 14 and a front section 16.

The rear section 14 of body 12 is of cup-shaped cylindrical configuration having a deep axial well 17 formed therein and provided with a slightly inwardly rearwardly tapering inner first conical surface 18 of uniform inclination terminating in an area adjacent the base of well 17, which is delineated by the flat front face 19 of rear wall 20 of the rear section 14. A circular opening 21 is formed in rear wall 20 coaxial with well 17. A plurality of circumferentially-spaced, countersunk longitudinal bores 22 are formed in rear wall 20 and extend to well 17.

A forwardly-directed, flat shoulder 23 extends outwardly from the front opening of well 17 and is surrounded by a coaxial forwardly projecting peripheral wall 24. A plurality of regularly peripherally-spaced tapped radial bores 24a are formed in and extend through peripheral wall 24, each of said tapped radial bores being engaged by a mating cap screw 26 whose leading end projects beyond the inner end of the corresponding tapped bore. Formed in the outer peripheral face of rear body section 14 is a shallow well 27 having a second shallow circular well 27a centrally formed therein and surrounded by a shoulder 29. Rear end 14 of the body 12 has secured thereto a cylindrical coupling section 11 engaging well 27a and provided with a peripheral flange 30. Said flange has openings formed therein permitting its securement as by bolts 31 to shoulder 29 provided with corresponding tapped bores. A plastic material feed opening extends radially through the wall of the body section 14 between the ends thereof and includes an outer section 32 having front and rear walls converging inwardly to an inner section 33 of substantially uniform width but having diverging side walls extending to a peripherally extending opening in well face 18.

Front section 16 of body 12 is in the form of a cylindrical collar having an anular rear face abutting shoulder 23 and an axial bore provided with an inner first cylindrical surface 36 coaxial with well 17 and having a diameter equal to that of the front opening of said well 17. The outer trailing peripheral cylindrical surface 37 of the collar 16 is of lesser diameter than and is in confronting spaced relationship with the inner cylindrical face of wall 24. The forward part of collar 16 is of enlarged transverse cross section, being delineated from the rear section thereof by an annular shoulder 38 overhanging the inner border and spaced slightly forwardly of the front face of wall 24. The inner ends of the cap screws 26 bear on the peripheral face 37 of the collar, the transverse position of the front body section 16 being adjustable relative to the rear section 14 by corresponding adjustment of cap screws 26. Front section 16 is releasably secured to rear section 14 by means of a plurality of socket head cap screws 35 registering with corresponding circumferentially-spaced countersunk longitudinal bores formed in the body member front section 16 and engaging mating aligned tapped bores formed in the shoulder 23.

Core member 13 nests in the well 17. Said core comprises a rear section 39, an intermediate section 40 delineated from the rear section by a peripherally extending groove 44 formed in the face of the core, and a front section 41. Rear section 39 has a peripheral second conical surface 42 which complements and snugly engages the body member conical surface 18 of the body member, and it has a flat rear face 43 parallel to and spaced slightly forwardly of face 19 of the body member when the core and body members are in locked assembly. Core front section 41 has a peripheral second cylindrical surface 46 coaxial with, of smaller diameter than, and in spaced confronting relationship with the first cylindrical surface 36 to delineate therewith an annular extrusion passage 47 which terminates at the front of the die in an annular extrusion opening 48 and extends to the rear of the front section 41 of the core.

The first groove 44 is inclined to the longitudinal axis of the die with its rear section in mating registry with the feed passage outlet opening 34 to provide a plastic distributing manifold which affords a substantially uniform flow resistance from the feed opening to any point along the extrusion opening. Groove 44 has an arcuate trailing face 49 and a leading face 50 tangent to trailing face 49 and forming a small angle to the longitudinal axis. The intermediate section 40 of the core has a conical peripheral surface parallel to and spaced from conical surface 18 to delineate therewith an annular passageway 52 communicating with the passageway 47. A second relatively small peripheral groove 53 is formed in the trailing part of the core front section 41 and defines an annular pressure equalizing chamber.

Core 13 is provided with an axial rearwardly-directed shank 54 registering with and of smaller diameter than aperture 21, and is secured in mating assembly with body 12 by a plurailty of cap screws 25 registering with countersunk bores 22 and engaging corresponding aligned tapped bores 22a formed in the rear face of core 13. Formed in the wall of body section 14 is a tapped radial bore communicating with the forward radial part of groove 44 and terminating at its inner end in a conical valve seat 55. A longitudinal bore 57 extends from the rear face of body 12 to the tapped radial bore just outside valve seat 55. A screw valve member 58 engages the tapped radial bore and is provided with a conical tip 59 which mates valve seat 55 thereby affording an adjustable valve opening between groove 44 and bore 57 to permit the variable bleeding of fluid plastic material from groove 44. In order to permit the introduction of compressed gas and other additives, if desired, into the tube extruded through die 10, an axial bore 60 is formed in the core member 13 and shank 54 and is provided with enlarged tapped sections at opposite ends thereof to facilitate the connection of fittings or couplings thereto.

A stepped annular recess is coaxially formed in the front face of the core member 13 and includes a rear relatively small section 63 delineated by opposite shoulders from a front relatively large section 64. An annular electrical heating unit 66 nests in recess 63 and is provided with suitable leads which extend therefrom through a longitudinal bore 65 extending through core member 13. A closure ring 67 mates and registers with the recess closure 64 and has a section of the rear thereof cut away to provide a space for the housing of a terminal plate. The closure ring is suitably separably bolted to core 13. In order to regulate the temperature of die 10 and the extruded plastic, there are provided, in addition to heating unit 66, band heating units 68 which encircle the body member sections 14 and 16. Heater units 66 and 68 are energized through any suitable regulating and control network.

The improved extrusion die 10 as described above is employed in the known manner with an associated extruder, compressed air system, cooling system and draw-off equipment. The molten thermoplastic resin is metered by the extruder through the feed passages 32 and 33 and opening 34 into and along the groove 44 which distributes the fluid plastic around the die passageway and through the annular passage into the pressure equalizing zone delineated by the second groove 53. The fluid plastic advances from groove 53 through annular passageway 47 at a uniform rate and is extruded in a soft state as a tube of uniform cross section through the extrusion opening 48 and is thereafter blown, cooled and drawn in the conventional manner. A highly uniform and constant extrusion is achieved by reason of the arrangement and relationship of grooves 44 and 53 and the associated annular passageways. The construction and assembly of the body and core members 12 and 13 provides a highly accurate die at a low cost and the adjustable association of the front and rear body member sections 14 and 16, as described, permits the simple compensation for variations in dimensions and operational parameters. In addition the subject structure is easily assembled and disassembled to permit the rapid servicing thereof.

While there has been described and illustrated a preferred embodiment of the present invention it is apparent that numerous alterations omissions and additions may be made without departing from the spirit thereof. For example, although groove 44 has been shown communicating with passage 48 by way of a passage 52, the shape of the groove 44 may be modified to obviate passage 52 by extending groove front face 50 to the core member cylindrical surface 46, whereby the shape of the groove 44 varies along the length thereof.

What is claimed is:

1. An extrusion die comprising a body member of non-circular symmetry having a well formed therein provided with a first peripheral conical surface at its inner section, a core member of non-circular symmetry nesting in said well and having a second conical peripheral surface at its inner section engaging said first surface and limited against axial movement into said well solely by said conical surfaces, at least one of said members having a peripheral groove formed therein, said members having radially-spaced confronting peripheral faces extending to the outer ends thereof to delineate an extrusion opening having a feed passage formed therein communicating with said groove to permit the feed of a plastic fluid thereto and separable securing means extending between said body and core members for axially urging said core into said well.

2. An extrusion die comprising a body member of non-circular symmetry having a well formed therein provided with a first rear face and a first peripheral conical surface at its inner section, a core member of non-circular symmetry nesting in said well and having a second conical peripheral surface at its inner section engaging said first surface and a second rear face axially spaced from said first rear face and having a first peripheral groove formed therein, said members having radially-spaced confronting peripheral faces extending to the outer ends thereof to delineate an extrusion opening and communicating with said peripheral groove, and said body member having a feed passage formed therein communicating with said groove to permit the feed of a plastic fluid thereto and separable securing means extending between said first and second faces for axially urging said core into said well.

3. An extrusion die comprising a body member of non-circular symmetry having a well formed therein provided with a first rear face and a first peripheral conical surface at its inner section, a core member of non-circular symmetry nesting in said well and having a second conical peripheral surface at its inner section engaging said first surface and a second rear face axially spaced from said first rear face and having formed therein a first peripheral groove inclined to the longitudinal axis of said core member, said members having radially-spaced confronting peripheral faces extending to the outer ends thereof to delineate an extrusion opening and communicating with said peripheral first groove, and said body member having a feed passage formed therein communicating with said first groove to permit the feed of a plastic fluid thereto and separable securing means extending between said first and second faces for axially urging said core into said well.

4. An extrusion die comprising a body member of non-circular symmetry having a well formed therein provided with a first rear face and a first peripheral conical surface at its inner section, a core member of non-circular symmetry nesting in said well and having a second conical peripheral surface and a second rear face axially spaced from said first rear face at its inner section engaging said first surface, said core member having a first relatively inner peripheral groove formed in the peripheral face thereof and inclined to the longitudinal axis of said core member and a second relatively outer peripheral groove, said members having radially-spaced confronting peripheral faces extending to the outer ends thereof to delineate an annular extrusion passage between the front of said die and second groove and an annular passage between said first and second grooves, said body member having a feed passage formed therein communicating with said first groove to permit the feed of a plastic fluid material thereto and separable securing means extending between said first and second faces for axially urging said core into said well.

5. An extrusion die comprising a body member of non-circular symmetry having a well formed therein provided with a first rear face and a first peripheral conical surface at its inner section and a first cylindrical surface at its outer section, a core member of non-circular symmetry nesting in said well and having a second conical peripheral surface at its inner section engaging said first conical surface and a second rear face axially spaced from said first rear face and a second cylindrical surface at its outer section coaxial with and radially-spaced from said first cylindrical surface to delineate therewith an axially-extending annular passage terminating at its front in an annular extrusion opening, said core member having formed in said second conical surface an inner peripheral groove inclined to the axis of said core member and communicating with the inner end of said annular passage and having formed in said second cylindrical surface a second peripheral groove, said body member having a feed passage formed therein communicating with said first groove to permit the feed of a plastic fluid thereto and separable securing means extending between said first and second faces for axially urging said core into said well.

6. An extrusion die comprising a body member of non-circular symmetry including a rear section having a well formed therein provided with a first rear face and a first conical peripheral face and a front section defined by a cylindrical collar coaxial with said well and mounted on said rear section and provided with an inner first cylindrical surface, a core member nesting in said body member of non-circular symmetry and including a rear section having a second conical peripheral face engaging said first conical peripheral face and a second rear face axially spaced from said first rear face and having formed therein a peripherally-extending rear first groove inclined to the longitudinal axis of said core member and a peripherally-extending front second groove, and a cylindrical front section having a second cylindrical surface substantially coaxial with, and confronting and of lesser diameter than said first cylindrical surface to delineate therewith a first annular passage extending from said second groove to the front face of said extrusion die, a second annular passage being formed between said core and body members affording communication between said first and second grooves, said body member rear section having a feed passage formed through a wall thereof communicating with said second groove at the rear portion thereof and separable securing means extending between said first and second faces for axially urging said core into said well.

7. The extrusion die of claim 6, including means for transversely adjusting said collar member relative to said body member rear section.

8. The extrusion die of claim 6, wherein said body member front section is provided with an annular, forwardly-directed inner shoulder surrounded by a forwardly-directed outer peripheral flange having a plurality of peripherally-spaced tapped radial bores formed therein, said collar member having a rear face engaging said shoulder and an outside diameter less than the inside diameter of said flange, and adjusting screws engaging each of said radial bores and bearing on the outer peripheral surface of said collar member.

9. The extrusion die of claim 6, wherein said second groove has a curved rear face and an inclined forward face extending forwardly at a small angle to the longitudinal axis of said core member.

10. The extrusion die of claim 6, wherein said body member has an opening in the rear thereof affording access to the rear face of said core member, said core member having a longitudinal air passage extending there-through and having a rear end registering with said opening.

11. The extrusion die of claim 6, wherein said core member has a cavity located in the front thereof and a longitudinal bore extending from said cavity to the rear of said core member, and including an electrical heating unit housed in said cavity.

12. The extrusion die of claim 6, wherein said body member has formed therein a tapped radial bore communicating with the forward section of said first groove, and a bleed bore transversely communicating with the inner part of said bleed bore, and including a screw valve engaging said tapped bore and movable across said bleed bore.

References Cited by the Examiner

UNITED STATES PATENTS

| 1,986,544 | 1/1935 | Theuer | 18—14 |
| 2,642,898 | 6/1953 | Acock et al. | |
| 2,859,476 | 11/1958 | Lainson | 18—13 |
| 2,957,201 | 10/1960 | Fields et al. | 18—13 |

FOREIGN PATENTS

| 1,025,834 | 1/1953 | France. |
| 1,140,337 | 11/1962 | Germany. |
| 938,855 | 10/1963 | Great Britain. |
| 981,737 | 1/1965 | Great Britain. |

WILLIAM J. STEPHENSON, *Primary Examiner.*